US012732362B2

(12) United States Patent
Jog et al.

(10) Patent No.: US 12,732,362 B2
(45) **Date of Patent: *Sep. 8, 2026**

(54) DISTRIBUTE ENCRYPTION KEYS SECURELY AND EFFICIENTLY

(71) Applicant: Google LLC, Mountain View, CA (US)

(72) Inventors: Rohit Jog, Mountain View, CA (US); Cristina Schmidt, Mountain View, CA (US); Clifford Arthur Frey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/988,851

(22) Filed: Dec. 19, 2024

(65) Prior Publication Data

US 2025/0119284 A1 Apr. 10, 2025

Related U.S. Application Data

(63) Continuation of application No. 17/010,993, filed on Sep. 3, 2020, now Pat. No. 12,200,119.

(51) Int. Cl.
*H04L 9/08* (2006.01)
*H04L 9/14* (2006.01)
*H04L 9/40* (2022.01)

(52) U.S. Cl.
CPC ............ *H04L 9/088* (2013.01); *H04L 9/0861* (2013.01); *H04L 9/14* (2013.01); *H04L 63/101* (2013.01); *H04L 9/0822* (2013.01)

(58) Field of Classification Search
None
See application file for complete search history.

(56) References Cited

U.S. PATENT DOCUMENTS 7,093,137 B1 8/2006 Sato et al.
7,178,021 B1 2/2007 Hanna et al.
(Continued)

FOREIGN PATENT DOCUMENTS

CN 101399663 A 4/2009
CN 104246789 A 12/2014
(Continued)

OTHER PUBLICATIONS

Notice of Intent to Grant, and translation thereof, from counterpart Indian Application No. 202347021878 dated Mar. 9, 2026, 2 pp.
(Continued)

*Primary Examiner* — Ali H. Cheema
(74) *Attorney, Agent, or Firm* — Shumaker & Sieffert, P.A.

(57) ABSTRACT

A method for distributing encryption keys includes receiving a table associated with a particular user, the table including a plurality of data blocks and splitting the table into a plurality of tablets including a corresponding portion of data blocks. The method also includes generating a resource key uniquely associated with the table and for each tablet generating a unique data encryption key for the corresponding tablet to encrypt with the unique data encryption key. The method also includes encrypting each data encryption key with the resource key and distributing control of each encrypted tablet and each corresponding encrypted data encryption key to a plurality of tablet servers, each controlling one or more of the encrypted tablets. The resource key transmits to a remote entity causing the remote entity to encrypt the resource key with a user key associated with the particular user and transmit the encrypted resource key.

14 Claims, 7 Drawing Sheets

(56) References Cited

U.S. PATENT DOCUMENTS

| | | | | |
|---|---|---|---|---|
| 7,266,699 | B2 | 9/2007 | Newman et al. | |
| 7,548,928 | B1 | 6/2009 | Dean et al. | |
| 7,707,225 | B2 | 4/2010 | Akashika et al. | |
| 7,778,419 | B2 | 8/2010 | Gebotys | |
| 7,917,964 | B2 | 3/2011 | Takashima et al. | |
| 8,607,358 | B1 | 12/2013 | Shankar et al. | |
| 8,626,749 | B1 | 1/2014 | Trepetin et al. | |
| 8,639,947 | B2 * | 1/2014 | Elovici | H04L 9/0836 705/52 |
| 8,650,657 | B1 * | 2/2014 | Shankar | H04L 9/0819 380/278 |
| 8,914,632 | B1 | 12/2014 | Shankar et al. | |
| 8,996,887 | B2 | 3/2015 | Kadatch et al. | |
| 9,442,980 | B1 | 9/2016 | Trepetin et al. | |
| 9,843,446 | B2 | 12/2017 | Mityagin | |
| 9,946,810 | B1 | 4/2018 | Trepetin et al. | |
| 10,372,935 | B1 | 8/2019 | Mwaura et al. | |
| 10,929,402 | B1 * | 2/2021 | Meng | H04L 9/0816 |
| 11,860,673 | B1 | 1/2024 | Kodakandla et al. | |
| 12,200,119 | B2 | 1/2025 | Jog et al. | |
| 2006/0112284 | A1 | 5/2006 | Kato et al. | |
| 2006/0288232 | A1 | 12/2006 | Ho et al. | |
| 2009/0225987 | A1 | 9/2009 | Metzger et al. | |
| 2010/0235633 | A1 | 9/2010 | Asano et al. | |
| 2013/0013921 | A1 * | 1/2013 | Bhathena | H04L 63/045 713/168 |
| 2013/0254536 | A1 | 9/2013 | Glover | |
| 2015/0280911 | A1 * | 10/2015 | Andoni | H04L 9/3234 713/168 |
| 2016/0148021 | A1 | 5/2016 | Wong et al. | |
| 2016/0239674 | A1 | 8/2016 | Bao et al. | |
| 2016/0350544 | A1 | 12/2016 | Wong | |
| 2017/0206372 | A1 | 7/2017 | Jung | |
| 2017/0286698 | A1 | 10/2017 | Shetty et al. | |
| 2018/0144152 | A1 | 5/2018 | Greatwood | |
| 2018/0145826 | A1 | 5/2018 | Greatwood | |
| 2018/0351928 | A1 * | 12/2018 | Yoo | H04L 9/0838 |
| 2018/0367540 | A1 | 12/2018 | Miranda | |
| 2019/0121887 | A1 | 4/2019 | Beier et al. | |
| 2019/0149320 | A1 | 5/2019 | Keselman et al. | |
| 2019/0318102 | A1 * | 10/2019 | Araya | H04L 9/0897 |
| 2019/0319785 | A1 | 10/2019 | Kumar et al. | |
| 2020/0135306 | A1 | 4/2020 | Wong | |

FOREIGN PATENT DOCUMENTS

| | | | | |
|---|---|---|---|---|
| CN | 105282171 | | 1/2016 | |
| CN | 105282171 | B | 4/2018 | |
| CN | 108696565 | A | 10/2018 | |
| CN | 108809906 | | 11/2018 | |
| CN | 110300112 | | 10/2019 | |
| CN | 110300112 | A | 10/2019 | |
| CN | 110446075 | A * | 11/2019 | H04N 21/4627 |
| CN | 110633580 | | 12/2019 | |
| CN | 110633580 | A | 12/2019 | |
| CN | 111355574 | A | 6/2020 | |
| CN | 108809906 | B | 7/2020 | |
| CN | 111639357 | | 9/2020 | |
| CN | 111639357 | A | 9/2020 | |
| GB | 2574076 | | 11/2019 | |
| GB | 2574076 | A | 11/2019 | |
| JP | H1188436 | A | 3/1999 | |
| JP | H11143780 | | 5/1999 | |
| JP | H11143780 | A | 5/1999 | |
| JP | 2002344921 | A | 11/2002 | |
| JP | 2006107323 | A | 4/2006 | |
| JP | 2006277695 | | 10/2006 | |
| JP | 2006277695 | A | 10/2006 | |
| JP | 2007026120 | | 2/2007 | |
| JP | 2007026120 | A | 2/2007 | |
| JP | 2017073074 | | 4/2017 | |
| JP | 2017073074 | A | 4/2017 | |
| JP | 2019061694 | | 4/2019 | |
| JP | 2019061694 | A | 4/2019 | |
| JP | 2020009500 | A * | 1/2020 | H04L 63/0471 |
| JP | 2020080560 | | 5/2020 | |
| JP | 2020080560 | A | 5/2020 | |
| KR | 1020080027347 | A | 3/2008 | |
| KR | 101285281 | B1 | 8/2013 | |
| WO | 2010057191 | | 5/2010 | |
| WO | 2010057191 | A2 | 5/2010 | |
| WO | 2019173774 | | 9/2019 | |
| WO | 2019173774 | A1 | 9/2019 | |

OTHER PUBLICATIONS

Notice of Intent to Grant, and translation thereof, from counterpart Korean Application No. 10-2023-7010624 dated Feb. 25, 2026, 5 pp.

Response to Office Action, and translation thereof, dated Sep. 2, 2025, from counterpart Korean Application No. 10-2023-7010624 filed Jan. 2, 2026, 43 pp.

Indian Examination Report for the related Application No. 202347021878, dated Aug. 28, 2023, 5 pages.

Martin Hentschel; (Data Encryption with Customer-Managed Keys); pp. 5, May 11, 2017 (Year: 2017).

Arshad Ali; (Granular or Cell Level Encryption vs. Transparent Data Encryption (TDE)); pp. 5; Jun. 23, 2014 (Year: 2014).

Prashanth Jayaram; (How to configure Always Encrypted in SQL Server 2016 using SSMS, PowerShell and T-SQL); pp. 25; Oct. 2, 2017 (Year: 2017).

Alejandro Corbellini et al. (Persisting big-data: The NoSQL landscape); pp. 23; Jul. 30, 2016 (Year: 2016).

Ameya Nayak et al. (Type of NOSQL Databases and its Comparison with Relational Databases) pp. 4; vol. 5, No. 4, Mar. 2013, (Year: 2013).

Office Action issued in related Japanese Patent Application No. 2023-514824, dated Jun. 4, 2024.

Shruthi Ramesh and Manimaran Govindarasu; (An Efficient Framework for Privacy-Preserving Computations on Encrypted IoT Data); pp. 9; Date of publication: May 28, (Year: 2020).

Bharat S. Rawal and S. Sree Vivek; (Secure Cloud Storage and File Sharing); pp. 6; Date of publication: Nov. 23, (Year: 2017).

Shruthi Ramesh and Manimaran Govindarasu; (An Efficient Framework for Privacy-Preserving Computations on Encrypted IoT Data); pp. 9; Date of publication: May 28, (Year: 2020).

Second Office Action, and machine translation thereof, from counterpart Chinese Application No. 202180054098.7 dated Mar. 14, 2026, 10 pp.

First Examination Report from counterpart Indian Application No. 202347021878 dated Feb. 13, 2024, 20 pp.

First Office Action and Search Report, and translation thereof, from counterpart Chinese Application No. 202180054098.7 dated Jun. 27, 2025, 14 pp.

International Search Report and Written Opinion of International Application No. PCT/US2021/048103 dated Dec. 13, 2021, 9 pp.

Notice of Intent to Grant and Text Intended to Grant from counterpart European Application No. 21783087.6 dated Apr. 8, 2025, 100 pp.

Prosecution History from U.S. Appl. No. 17/010,993, dated Nov. 30, 2022 through Sep. 11, 2024, 235 pp.

Response to Communication Pursuant to Rules 161(1) and 162 EPC dated Apr. 13, 2023, from counterpart European Application No. 21783087.6, filed Oct. 12, 2023, 22 pp.

Extended Search Report from counterpart European Application No. 25189344.2 dated Oct. 14, 2025, 9 pp.

Office Action, and translation thereof, from counterpart Korean Application No. 10-2023-7010624 dated Sep. 2, 2025, 15 pp.

Response to Office Action, and translation thereof, dated Jun. 27, 2025, from counterpart Chinese Application No. 202180054098.7 filed Oct. 27, 2025, 38 pp.

Notification of Reason for Refusal, and translation thereof, from counterpart Japanese Application No. 2024-230406 dated Mar. 19, 2026, 6 pp.

Response to Extended Search Report dated Nov. 17, 2025, from counterpart European Application No. 25189344.2 filed May 12, 2026, 54 pp.

(56) References Cited

OTHER PUBLICATIONS

Response to Second Office Action, and translation thereof, dated Mar. 14, 2026, from counterpart Chinese Application No. 202180054098.7 filed May 9, 2026, 22 pp.
Notice of Intent to Grant, and translation thereof, from counterpart Chinese Application No. 202180054098.7 dated Jun. 29, 2026, 10 pp.
Response to Office Action, and translation thereof, dated Mar. 19, 2026, from counterpart Japanese Application No. 2024-230406 filed Jun. 25, 2026, 8 pp.

* cited by examiner

DISTRIBUTE ENCRYPTION KEYS SECURELY AND EFFICIENTLY

CROSS REFERENCE TO RELATED APPLICATIONS

This U.S. Patent Application is a continuation of, and claims priority under 35 U.S.C. § 120 from, U.S. patent application Ser. No. 17/010,993, filed on Sep. 3, 2020. The disclosure of this prior application is considered part of the disclosure of this application and is hereby incorporated by reference in its entirety.

TECHNICAL FIELD

This disclosure relates to distributing encryption keys securely and efficiently.

BACKGROUND

Cloud computing has increased in popularity as storage of large quantities of data in the cloud becomes more common. The use of encryption has also grown to protect the increasingly large quantity of data stored in the cloud. Cloud service providers manage the encryption keys that protect customer data from access by unauthorized users. Some customers may choose to generate their own encryption keys, which adds another layer of complexity to key management. With the increasingly large quantity of data stored on the cloud and the complexity of encryption, managing the encryption keys is often a cumbersome process.

SUMMARY

One aspect of the disclosure provides a method for distributing encryption keys securely and efficiently. The method includes receiving, at data processing hardware, a table associated with a particular user. The table includes a plurality of data blocks. The method also includes splitting, by the data processing hardware, the table into a plurality of tablets. Each tablet includes a corresponding portion of the plurality of data blocks of the table. The method also includes generating, by the data processing hardware, a resource key uniquely associated with the table. For each tablet of the plurality of tablets, the method includes generating, at the data processing hardware, a unique data encryption key for the corresponding tablet and encrypting, by the data processing hardware, the corresponding tablet with the unique data encryption key. The method also includes encrypting, by the data processing hardware, the data encryption key with the resource key. The method includes distributing, by the data processing hardware, control of each encrypted tablet and each corresponding encrypted data encryption key to a plurality of tablet servers. Each tablet server in the plurality of tablet servers is independent from each other tablet server in the plurality of tablet servers and controls one or more of the encrypted tablets from the table. The method includes transmitting, by the data processing hardware, the resource key to a remote entity, which, when received by the remote entity causes the remote entity to encrypt the resource key with a user key associated with the particular user and kept secret from the data processing hardware and transmit the encrypted resource key to the data processing hardware.

Implementations of the disclosure may include one or more of the following optional features. In some implementations, the method further includes, after receiving the encrypted resource key from the remote entity, obtaining, by the data processing hardware, a request to access one or more data blocks of the table; generating, by the data processing hardware, a resource key decryption request that includes the encrypted resource key; and transmitting, by the data processing hardware, the resource key decryption request to the remote entity. In these implementations, transmitting the resource key decryption request causes the remote entity to decrypt the encrypted resource key with the user key associated with the particular user and transmit the decrypted resource key to the data processing hardware. In some examples, the method also includes, after receiving the decrypted resource key, encrypting, by the data processing hardware, the decrypted resource key with an access control key associated with an access control list (ACL). The ACL includes a list of tablet servers authorized to access the resource key. In some implementations, the access control list is based on a role assigned to one or more tablet servers of the plurality of tablet servers. Optionally, the method may also include: receiving, at the data processing hardware, a resource key request requesting the resource key in a decrypted form from one of the tablet servers of the plurality of tablet servers; determining, by the data processing hardware, whether the one of the tablet servers is authorized to access the resource key based on the ACL; and when the one of the tablet servers is authorized to access the resource key, decrypting, by the data processing hardware, the encrypted resource key with the access control key and transmitting, by the data processing hardware, the decrypted resource key to the one of the tablet servers. In some examples, the decrypted resource key, when received by the one of the tablet servers, causes the one of the tablet server to decrypt, using the decrypted resource key, the data encryption key corresponding to at least one tablet controlled by the one of the tablet servers and decrypt, using the decrypted data encryption key, the corresponding at least one tablet.

The resource key may include an expiration time limit. Optionally, the method includes rotating, by the data processing hardware, the resource key at a rotation rate that is less than the expiration time limit of the resource key. In some examples, the expiration time limit and the rotation rate are each configurable by the particular user. In some implementations, the corresponding portion of data blocks of each tablet includes different data blocks than the corresponding portions of data blocks of each other tablet.

Another aspect of the disclosure provides a system for distributing encryption keys securely and efficiently. The system includes data processing hardware and memory hardware in communication with the data processing hardware. The memory hardware stores instructions that when executed on the data processing hardware cause the data processing hardware to perform operations. The operations include receiving a table associated with a particular user. The table includes a plurality of data blocks. The operations also include splitting the table into a plurality of tablets. Each tablet includes a corresponding portion of the plurality of data blocks of the table. The operations also include generating a resource key uniquely associated with the table. For each tablet of the plurality of tablets, the operations include generating a unique data encryption key for the corresponding tablet and encrypting the corresponding tablet with the unique data encryption key. The operations also include encrypting the data encryption key with the resource key. The operations include distributing control of each encrypted tablet and each corresponding encrypted data encryption key to a plurality of tablet servers. Each tablet server in the plurality of tablet servers is independent from each other tablet server in the plurality of tablet servers and controls one or more of the encrypted tablets from the table. The operations include transmitting the resource key to a remote entity, which, when received by the remote entity, causes the remote entity to encrypt the resource key with a user key associated with the particular user and kept secret from the data processing hardware, and transmit the encrypted resource key to the data processing hardware.

Implementations of the disclosure may include one or more of the following optional features. In some implementations, the operations also include, after receiving the encrypted resource key from the remote entity: obtaining a request to access one or more data blocks of the table; generating a resource key decryption request that includes the encrypted resource key; and transmitting the resource key decryption request to the remote entity. Transmitting the resource key decryption request may cause the remote entity to decrypt the encrypted resource key with the user key associated with the particular user and transmit the decrypted resource key to the data processing hardware.

In some examples, the operations also include, after receiving the decrypted resource key, encrypting the decrypted resource key with an access control key associated with an access control list (ACL). The ACL includes a list of tablet servers authorized to access the resource key. In some implementations, the access control list is based on a role assigned to one or more tablet servers of the plurality of tablet servers. Optionally, the operations may also include: receiving a resource key request requesting the resource key in a decrypted form from one of the tablet servers of the plurality of tablet servers; determining whether the one of the tablet servers is authorized to access the resource key based on the ACL; and when the one of the tablet servers is authorized to access the resource key, decrypting the encrypted resource key with the access control key and transmitting the decrypted resource key to the one of the tablet servers. In some examples, the decrypted resource key, when received by the one of the tablet servers causes the one of the tablet server to decrypt, using the decrypted resource key, the data encryption key corresponding to at least one tablet controlled by the one of the tablet servers and decrypt, using the decrypted data encryption key, the corresponding at least one tablet.

The resource key may include an expiration time limit. Optionally, the operations include rotating the resource key at a rotation rate that is less than the expiration time limit of the resource key. In some examples, the expiration time limit and the rotation rate are each configurable by the particular user. In some implementations, the corresponding portion of data blocks of each tablet includes different data blocks than the corresponding portions of data blocks of each other tablet.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In a cloud computing environment, large collections of data (e.g., tables) may be spread across hundreds if not thousands of different computing platforms such as servers. It is often desirable or necessary to protect access to this data via the use of encryption. For example, customer managed keys (CMK) is an architectural pattern that allows a client to protect data distributed in the cloud with the client's own keys. This ensures that only the client and no one else (not even the cloud provider) has access to the client's data. However, when dealing with large amounts of data and thousands of servers, protecting and distributing keys becomes logistically difficult.

Implementations herein are directed toward a key management system that distributes control of portions of a table (i.e., tablets) to a plurality of servers (i.e., tablet servers). The system generates a unique resource key associated with the table and unique data encryption keys for each tablet. The data encryption keys are "wrapped" (i.e., encrypted) by the resource key and the resource key is wrapped by a user key associated with a user or customer or client associated with the table. Thus, the user (e.g., the owner of the data) controls access to the data stored in the tablets by controlling the user key.

The system may wrap the resource key with an access control key associated with an access control list. Using the access control key and the access control list, the system ensures that only authorized tablet servers gain access to the decrypted resource key and subsequently access to the data encryption keys. Furthermore, use of the intermediate resource key and access control key greatly reduces the number of requests for key decryption requests the system requires. Thus, the key management system distributes keys efficiently and securely even in extremely large distributed computing environments.

Figure 1:
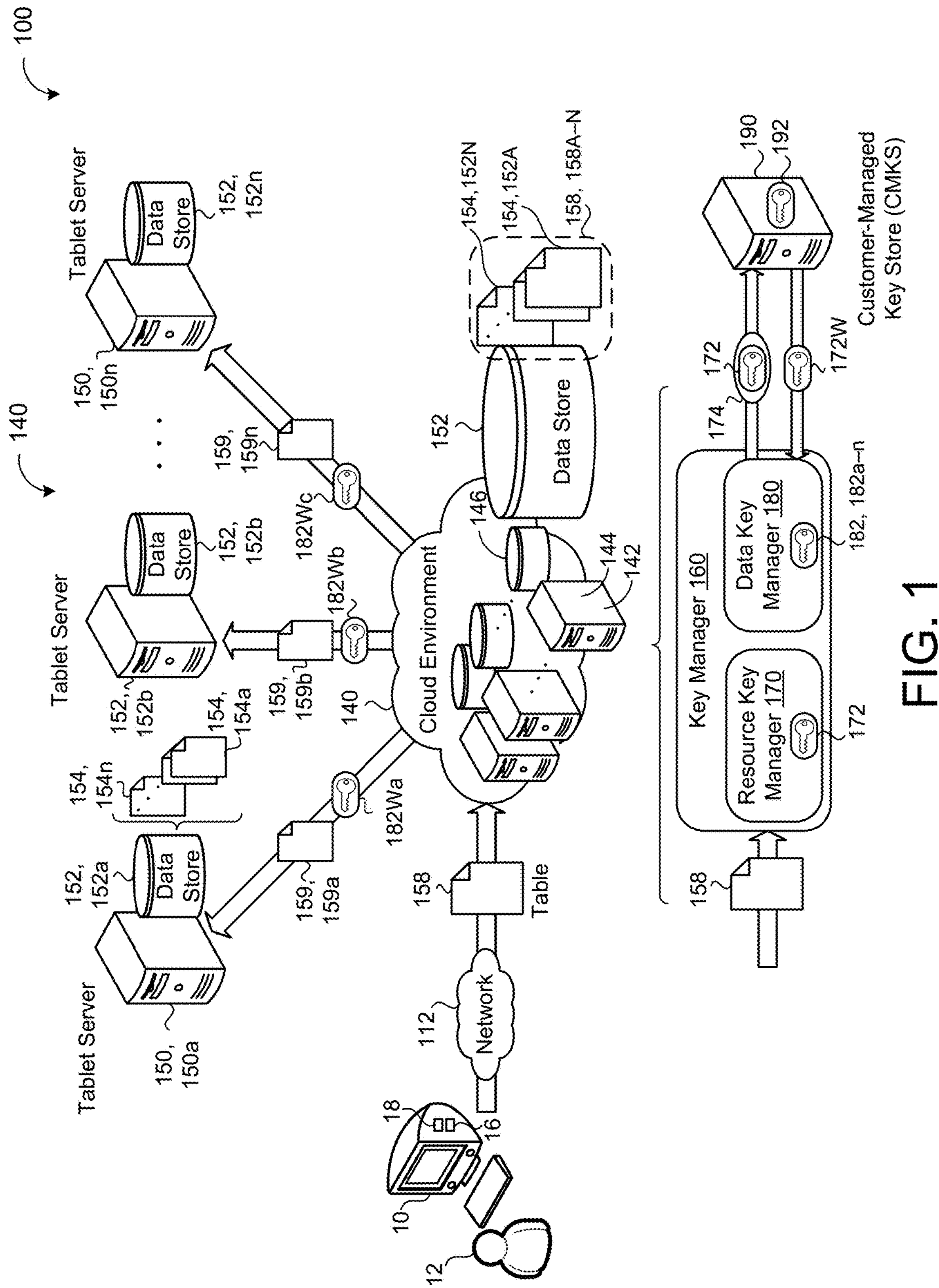
FIG. 1 is a schematic view of an example system for distributing encryption keys.

Referring now to FIG. 1, in some implementations, an example key management system 100 includes a remote system 140 in communication with one or more user devices 10 via a network 112. The remote system 140 may be multiple computers or a distributed system (e.g., a cloud environment) having scalable/elastic resources 142 including computing resources 144 (e.g., data processing hardware) and/or storage resources 146 (e.g., memory hardware). A data store 152 (i.e., a remote storage device) may be overlain on the storage resources 146 to allow scalable use of the storage resources 146 by one or more of the clients (e.g., the user device 10) or the computing resources 144. The data store 152 is configured to store a plurality of data blocks 154, 154*a-n* within one or more tables 158, 158*a-n* (i.e., a cloud database). The data store 152 may store any number of tables 158 associated with any number of users 12 at any point in time.

The remote system 140 is configured to receive a table 158 from a user device 10 associated with a respective user 12 via, for example, a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The remote system 140 splits the table 158 into a plurality of tablets 159, 159*a-n*. Each tablet 159 includes a corresponding portion of the plurality of data blocks 154 of the table 158. For example, each tablet 159 includes a respective portion of rows and/or columns of the table 158. In some examples, each tablet 159 is approximately the same size (i.e., includes approximately the same amount of data), while in other examples, the tablets 159 vary in size. Optionally, the corresponding portion of data blocks of each tablet includes different data blocks than the corresponding portions of data blocks of each other tablet.

The remote system 140 executes a key manager 160 that includes a resource key manager 170 and a data key manager 180. The resource key manager 170 generates a resource key 172 that is uniquely associated with the table 158. That is, a new resource key 172 is generated for each table 158 received by the key manager 160 (either from the same user 12 or a different user) and each table 158 is associated with a single resource key 172 at a time. The data key manager 180, for each tablet 159 of the plurality of tablets 159 of the table 158, generates a unique data encryption key (DEK) 182, 182*a-n*. The data key manager 180 encrypts each tablet 159 with its respective DEK 182. Thus, each tablet 159 may only be accessed (i.e., in plaintext) via decryption with the corresponding DEK 182.

The resource key manager 170 wraps (i.e., encrypts) each DEK 182 with the resource key 172 associated with the table 158. That is, each tablet 159 of the table 158 is encrypted by a DEK 182 uniquely associated with the corresponding tablet 159 and each DEK 182 is encrypted by the resource key 172 uniquely associated with the table 158 that originated the tablets 159. Thus, the key manager 160 encrypts all DEKs 182 that correspond to the same table 158 with the same resource key 172.

The key manager 160 distributes control of each tablet 159 (encrypted by the DEK 182) to a plurality of tablet servers 150, 150*a-n*. That is, control of the tablets 159 are distributed among two or more tablet servers 150, with each tablet server 150 receiving control of one or more tablets 159. Each tablet server 150 may receive control of any number of tablets 159 and the system 100 may distribute control of the tablets 159 to any number of tablet servers 150. As used herein, control of a tablet 159 refers to a responsibility to service requests to access the data of the controlled tablets 159. For example, a tablet server 150 that controls an encrypted tablet 152 (i.e., encrypted data-at-rest) receives requests (e.g., originating from a client or user 12) to access data stored within the encrypted tablet 152. The tablet server 150 responds to the request by decrypting the tablet 159 and providing the requested data. Thus, in some implementations, the tablet servers 150 are part of the distributed computing and storage environment of the remote system 140 that are designated to control (i.e., service data requests) to portions of tables 158 (i.e., tablets 159) for the remote system 140. Alternatively, the tablet servers 150 may be independent from the remote system 140 and receive the tablets 150 to store in local storage.

While examples herein show a single table 158 and three tablet servers 159 for clarity, typically, each tablet server 150 will control many tablets 159 from many different tables 158. For example, the system 100 includes thousands of tables 158 with control distributed amongst thousands of tablet servers 150 to create a large-scale distributed storage system. Distribution of control of the tablets 159 across multiple tablet servers 150 may increase access capacity (i.e., the number of simultaneous accesses to the data the system 140 supports).

Each tablet server 150 maintains the designated tablets 159 stored within a corresponding portion of the data store 152, which, when combined with the corresponding portions of the data store 152 of each other tablet server 150, forms the cloud database for storage of the table 158, allowing scalable use of the storage resources 146. Each tablet server 150 also receives wrapped DEKs 182W, 182Wa-n corresponding to at least the tablets 159 controlled by the tablet server 150. That is, each tablet server 150 controls one or more tablets 159 encrypted by a respective DEK 182 and each wrapped DEK 182W (i.e., the DEK 182 encrypted by the resource key 172) that corresponds to the controlled tablets 159. Thus, to obtain access to the tablets 159, the tablet server 150 must first obtain the unwrapped DEK 182 (i.e., via decryption by the resource key 172).

The key manager 160 transmits a wrap request 174 to a remote entity 190. In some examples, the remote entity 190 is a customer-managed key store (CKMS). The remote entity 190 controls one or more user keys 192 (which also may be referred to as a customer key or client key or customer-managed encryption key (CMEK) herein). The remote system 140 does not receive access to the user key 192 and instead, the remote entity 190 (i.e., the CKMS) retains sole access to the user key 192. In some examples, the wrap request 174 includes the resource key 172. After receiving the wrap request 174, the remote entity 190 may authorize and/or authenticate the key manager 160. That is, the remote entity 190 verifies that the key manager 160 is allowed to have operations (e.g., encryption/decryption operations) performed using the user key 192 at that point in time. Permissions may be granted and denied by the user 12 or a third party on behalf of the user 12.

After authenticating and/or authorizing the key manager 160, the remote entity 190 encrypts the resource key 172 with the user key 192. The remote entity 190 may uniquely associate the user key 192 with the table 158. Alternatively, the user key 192 protects a variety of assets associated with the user 12 (e.g., multiple tables 158). The remote entity 190 transmits the wrapped resource key 172W (i.e., the resource key 172 encrypted by the user key 192) to the key manager 160. The key manager 160 deletes or otherwise discards all plaintext (i.e., unencrypted) copies of the resource key 172 and all plaintext copies of the DEKs 182. Thus, all tablets 159 controlled by the tablet servers 150 are encrypted by DEKs 182 that in turn are wrapped by the resource key 172 which in turn is wrapped by the user key 192. Because the user key 192 is under sole control of the remote entity 190, no other entity (including the remote system 140) may access the tablets 159 without authorization from the user 12 or a third-party on behalf of the user 12.

Figure 2:
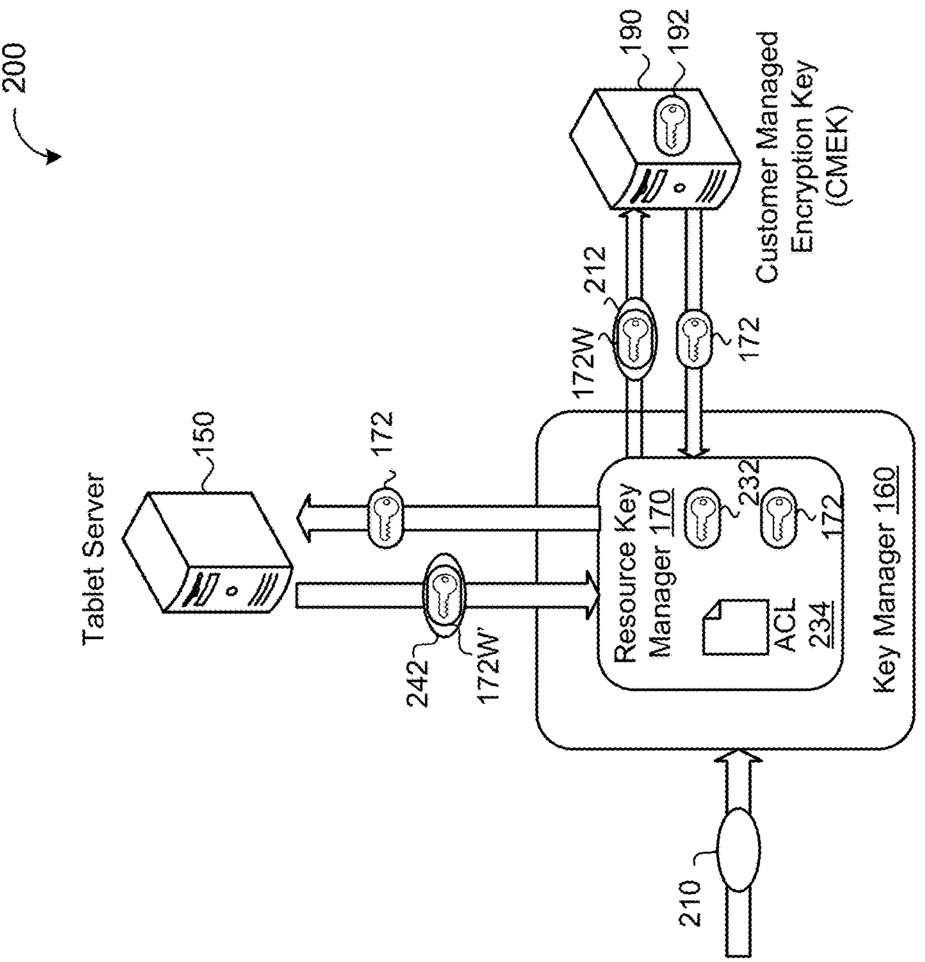
FIG. 2 is a schematic view of exemplary components of the system of FIG. 1.

Referring now to FIG. 2, a schematic view 200 shows that the key manager 160, in some implementations, after receiving the encrypted resource key 172W from the remote entity 190, receives a data request 210 to access one or more data blocks 154 of the table 158. The data request 210 may originate from the user 12 or another entity authorized by the user. The data request 210 may also originate from one of the tablet servers 159 or a table manager executing on the remote system 140 (e.g., to rebalance data, compact data, recover data, etc.). In response to receiving the data request 210 to access the one or more data blocks 154, the key manager 160 generates a resource key decryption request 212 that includes the wrapped resource key 172W and transmits the resource key decryption request 212 to the remote entity 190 (e.g., the CMEK). The remote entity 190, after receiving the resource key decryption request 212 (that includes the wrapped resource key 172W), decrypts the wrapped resource key 172W using the user key 192 associated with the particular user 12. Prior to decrypting the wrapped resource key 172W, the remote entity 190 may authorize and/or authenticate the key manager 160. Optionally, the key manager 160 includes credentials or other identifying information with the resource key decryption request 212 to assist in authorization and/or authentication. After unwrapping the wrapped resource key 172W, the remote entity 190 transmits the unwrapped resource key 172 to the key manager 160. Note that, while the remote entity 190 decrypts the resource key 172W using the user key 192, the remote entity 190 and key manager need not communicate "in the clear". That is, the key manager 160 and remote entity 190 may share symmetric keys and/or asymmetric keys (e.g., public-key cryptography) to ensure that all communications between the key manager 160 and the remote entity 190 are secure.

In some examples, the key manager 160, after receiving the unwrapped resource key 172 from the remote entity 190, encrypts the decrypted resource key 172 with an access control key 232 associated with an access control list (ACL) 234 (i.e., the wrapped resource key 172W'). In some implementations, the ACL 234 corresponds to a list of tablet servers 150 authorized to access the resource key 172. For example, the key manager 160 generates the ACL 234 when distributing control of the tablets 159 to the tablet servers 150 to determine which tablet servers 150 have access to which tablets 159. That is, the key manager 160 may authorize or allow a tablet server 150 (via the ACL 234) to access the resource key 172 (to decrypt the DEKs 182) based on whether the tablet server 150 controls any tablets 159 of the table 158 associated with the resource key 172.

In some examples, the ACL 234 is based on a role assigned to one or more tablet servers 150. For example, all tablet servers 150 execute in a specific role such as a production (i.e., "prod") role associated with one or more tables 158. Other tablet servers 150 (e.g., a malicious tablet server) cannot be assigned this same role. Thus, the ACL 234 may ensure the requesting tablet server 150 is assigned the proper role based on the table 158 and/or resource key 172 that the tablet server 150 requests access to. This allows only authorized tablet servers 150 assigned to the authorized role to access the resource key 172 unwrapped by the access control key 232. The ACL 234 may enforce other means of access control as well. For example, the ACL 234 includes identifiers for each authorized tablet server 150 and the tablet server 150 verifies its identity (e.g., via a digital signature) when required.

In some examples, the key manager 160 after wrapping the resource key 172 with the access control key 232, distributes the wrapped resource key 172W' (i.e., the resource key 172 encrypted by the access control key 232) to all tablet servers 150 in communication with the key manager 160 regardless of whether each respective tablet server 150 is authorized to access the unwrapped resource key 172. For simplicity, the key manager 160 distributing the wrapped resource key 172W' to all the tablet servers 150 is omitted from the example of FIG. 2. Because each tablet server 150 must request access to the unwrapped resource key 172 protected by the ACL 234, the key manager 160 may safely broadcast the wrapped resource key 172W' to the tablet servers 150. This eliminates the need for the key manager 160 to care or even be aware of what tablet servers 150 exist and which tablets 159 each tablet server 150 stores.

After receiving the wrapped resource key 172W' (now shown in FIG. 2), one of the tablet servers 150 may generate a resource key unwrap request 242 requesting the key manager 160 to unwrap the wrapped resource key 172W'. Because the tablet server 150 may control tablets 159 from a plurality of tables 158 (each associated with a different resource key 172), the tablet server 150 may include the wrapped resource key 172W' within the request 242 to indicate to the key manager 160 which resource key 172 the tablet server 150 requests access to.

The key manager 160 receives the resource key unwrap request 242 from the one of the tablet servers 150 and determines whether the tablet server 150 is authorized to access the unwrapped resource key 172 based on the ACL 234. When the tablet server 150 is authorized to access the resource key 172, the key manager 160 decrypts the wrapped resource key 172W' using the access control key 232. The key manager 160 transmits the unwrapped resource key 172 to the authorized tablet server 150. When the tablet server 150 is not authorized (e.g., the tablet server 150 is not approved by the ACL 234 and/or the tablet server 150 is not running with an approved role), the key manager 160 may deny the unauthorized tablet server 150 access to the decrypted resource key 172.

The tablet server 150, after receiving the decrypted resource key 172 as depicted in FIG. 2, may unwrap/decrypt one or more of the wrapped DEKs 182W using the resource key 172. After unwrapping one or more wrapped DEKs 182W, the tablet server 150 uses the unwrapped DEK(s) 182 to unwrap the tablets 159 encrypted by the corresponding DEKs 182. In some implementations, the tablet server 150 caches the unwrapped DEKs 182 (e.g., in volatile memory) for a period of time to reduce the frequency the tablet server 150 transmits resource key unwrap requests 242 to the key manager 160. For example, the tablet server caches the decrypted DEKs 182 for one hour. After the period of time expires, the tablet server 150 may flush the cached DEKs 182 and again transmit a resource key unwrap request 242 to the key manager 160. That is, when the tablet server 150 caches the DEKs 182, the tablet server 150 may use the cached DEKs 182 rather than again requesting the key manager to unwrap the DEKs 182W.

The tablet server 150, in some examples, unwraps all DEKs 182W associated with the same table 158 as the resource key 172 associated with the table 158 is used to wrap all DEKs corresponding to tablets 159 of the table 158. Thus, with a single resource key unwrap request 210 to the key manager 160, the tablet server 150 may gain access to all tablets 159 of the same table 158. In contrast to conventional techniques that include a request for each DEK 182, the key manager 160 greatly reduces the number of communications and the amount of time required to distribute the DEKs 182.

Figure 3:
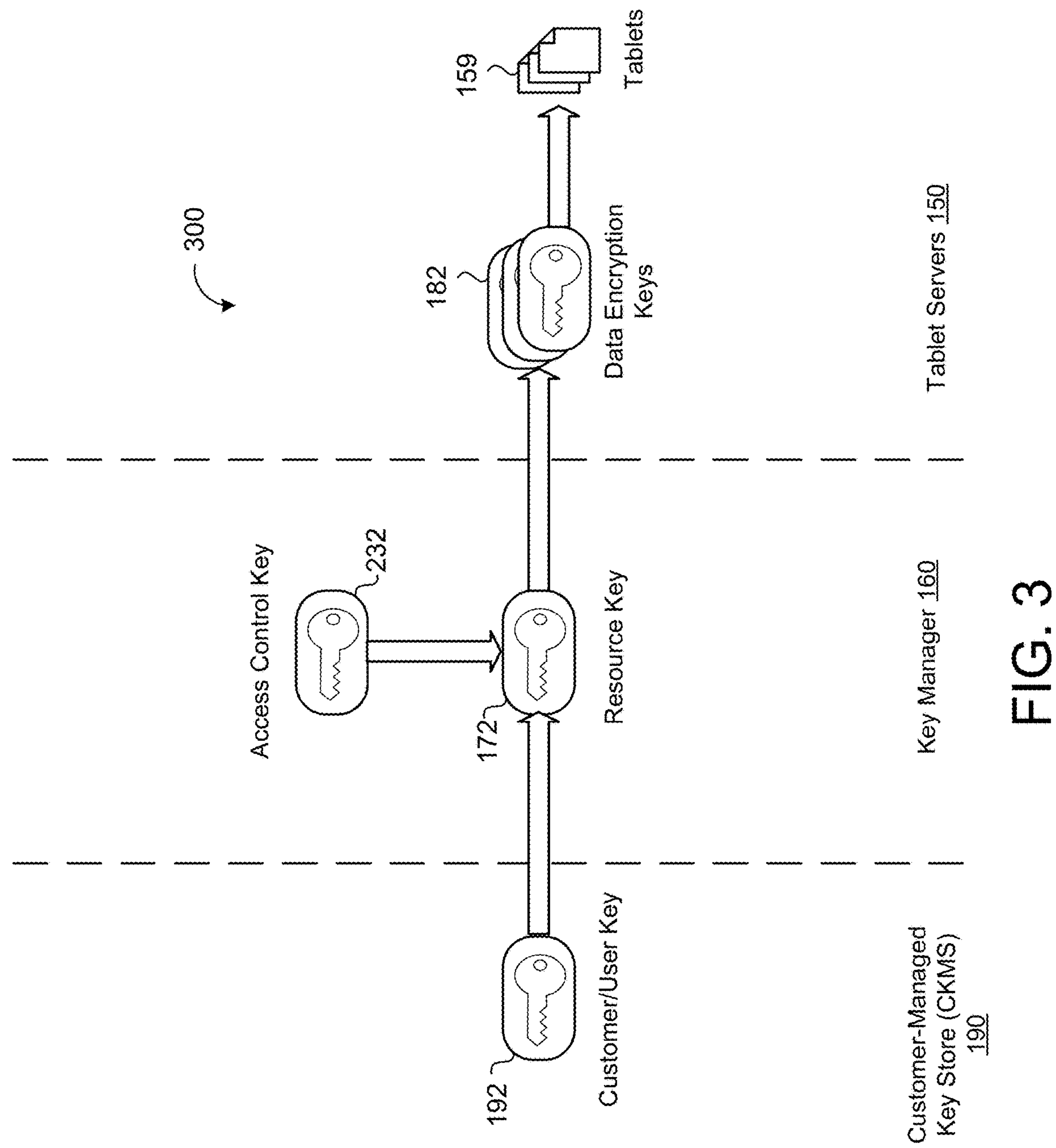
FIG. 3 is a schematic view of encryption key domains.

Referring now to FIG. 3, a schematic view 300 demonstrates exemplary key domains for the system 100. Here, the remote entity 190 (e.g., the CKMS) retains sole access to the user key 192 by keeping the user key 192 secret from all other entities (including the remote system 140 and key manager 160). That is, while authorized entities may request that the remote entity 190 perform operations with the user key 192 (e.g., encryption and decryption operations), the remote entity 190 will not reveal the user key 192 when performing the actions.

The key manager 160 generates and maintains both the access control key 232 and the resource key 172. Both the access control key 232 and the user key 192 (under control of the remote entity 190) wrap/encrypt the resource key 172. The key manager 160 may have sole access to the access control key 232. In some implementations, the key manager 160 wraps the resource key 172 with the access control key 232 after the key manager 160 receives the unwrapped resource key 172 from the remote entity 190.

The resource key 172 wraps one or more DEKs 182 stored at one or more tablet servers 150. In some examples, the key manager 160 distributes the resource key 172W' wrapped by the access control key to each tablet server 150. The tablet servers 150 request access to the DEKs 182 wrapped by the resource key 172 (and correspondingly to the tablets 159 that the DEKs 182 encrypt) from the key manager 160. After authorizing the tablet server 150 (e.g., via the ACL 234), the key manager 160 unwraps the wrapped resource key 172W' and transmits the unwrapped resource key 172 to the corresponding tablet server 150. The tablet server 150 may unwrap one or more DEKs 182 to access one or more of the tablets 159 stored at the tablet server 150.

Figure 4:
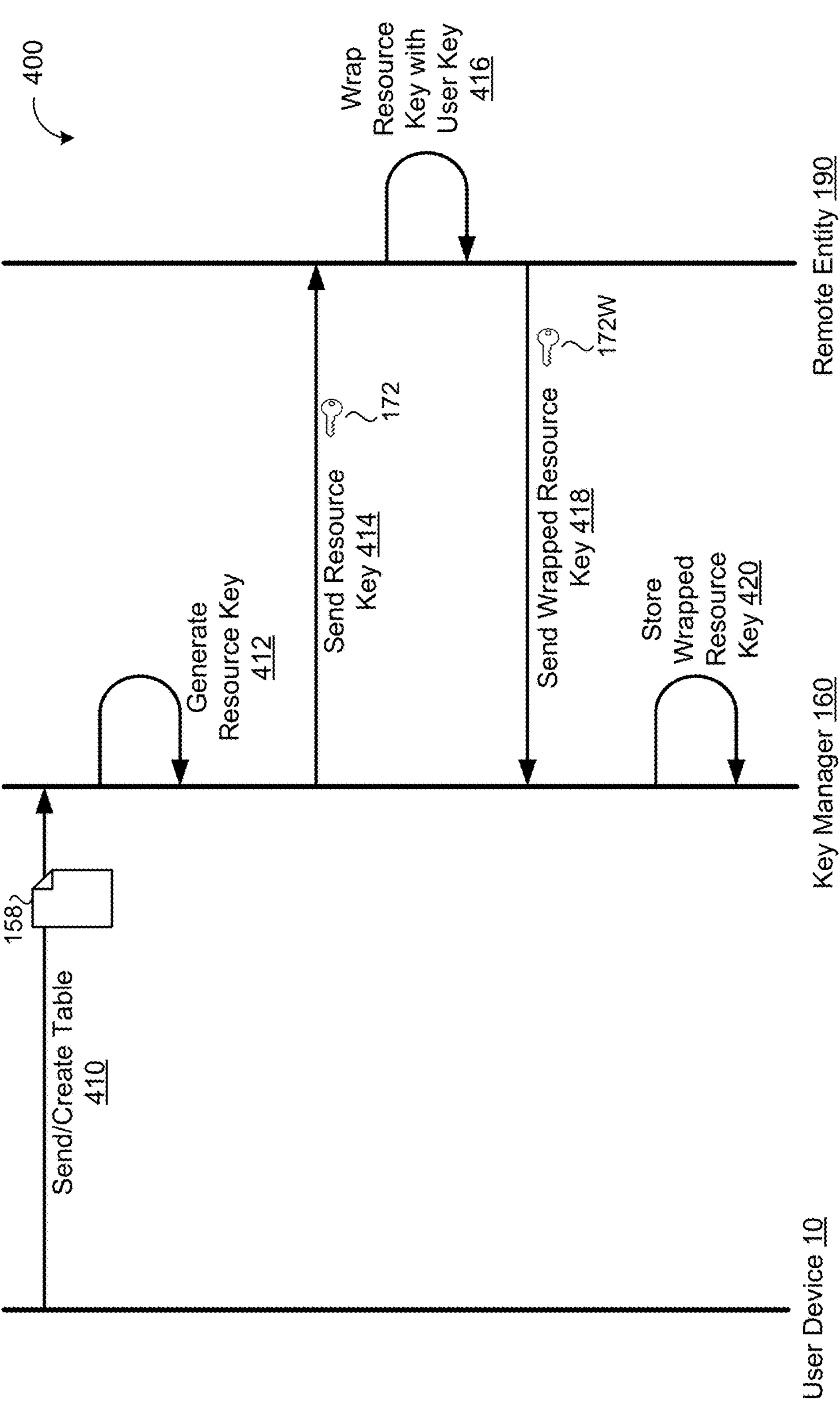
FIG. 4 is a schematic view of a sequence diagram for generating a resource key.

FIG. 4 provides a sequence diagram 400 for steps to generate the resource key 172. The Y-axis of the sequence diagram 400 represents time increasing from top to bottom to provide an order to the steps. The steps begin at the top of the Y-axis (i.e., the earliest point in time) and proceed in order down the Y-axis. The parallel vertical lines represent the user device 10, the key manager 160, and the remote entity 190, respectively. At step 410, the user device 10 creates and sends or commands the key manager 160 to create the table 158. Next, the key manager 160, at step 412, generates the resource key 172. The resource key 172 is uniquely associated with the table 158 created at step 410. The key manager 160 then sends the generated resource key 172 to the remote entity at step 414. The key manager includes the resource key 172 within a wrap request 174. The remote entity 190, at step 416, after authorizing and/or authentication the key manager 160, wraps the resource key 172 with the user key 192. At step 418, the remote entity 190 transmits the wrapped resource key 172W to the key manager 160. After receiving the wrapped resource key 172W, the key manager 160, at step 420, stores the wrapped resource key 172W (e.g., caches the key 172W in volatile memory).

Figure 5:
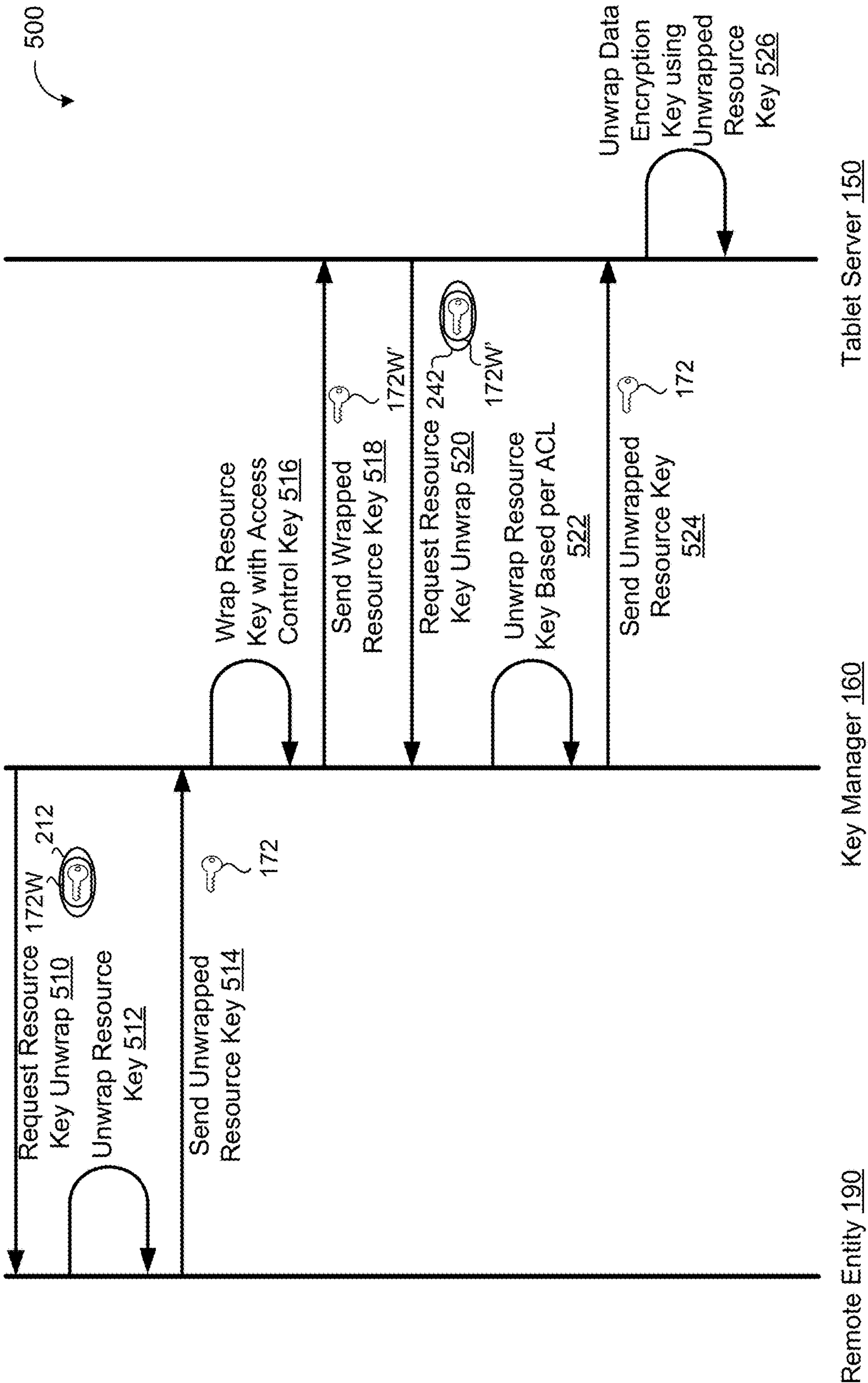
FIG. 5 is a schematic view of a sequence diagram for decrypting data encryption keys.

Referring now to FIG. 5, a sequence diagram 500 includes steps to unwrap the wrapped DEKs 182W with the resource key 172. The steps begin at the top of the Y-axis (i.e., the earliest point in time) and proceed in order down the Y-axis. The parallel vertical lines represent the remote entity 190, the key manager 160, and the tablet server 150, respectively. The sequence diagram 500 begins at step 510 when the key manager 160 transmits a resource key decryption request 212 to the remote entity 190. At step 512, the remote entity 190, after receiving the resource key decryption request 212, unwraps (i.e., decrypts) the wrapped resource key 172W using the user key 192 that is associated with the user 12 that created and/or owns the table 158.

At step 514, the remote entity 190 transmits the unwrapped resource key 172 to the key manager 160. The key manager 160, at step 516, wraps the unwrapped resource key 172 with the access control key 232. At step 518, the key manager 160, transmits the wrapped resource key 172W' (i.e., wrapped by the access control key 232) to one or more tablet servers 150. One of the tablet servers 150, at step 520, sends a resource key unwrap request 242 that includes the wrapped resource key 172W' to the key manager 160. The key manager 160 may determine whether the tablet server 150 is authorized to access the resource key 172 (e.g., based on the ACL 234). When the tablet server 150 is authorized, the key manager 160, at step 522, unwraps the wrapped resource key 172W' using the access control key 232 and, at step 524, transmits the unwrapped resource key 172 to the tablet server 150. The tablet server 150, at step 526, unwraps one or more wrapped DEKs 182W with the resource key 172.

In some implementations, the resource key 172 includes an expiration time limit. The expiration time limit indicates a time period that the key is valid. That is, once the key is expired, the remote system 140 may not and will not use the expired key to perform any encryption or decryption operations. The expiration time limit prevents the system from using "stale" keys in the event that, for example, communication is lost between devices (e.g., between the key manager 160 and the remote entity 190 and/or between the key manager 160 and the tablet servers 150).

In some examples, the key manager 160 rotates the resource key 172 at a rotation rate that is less than the expiration time limit of the resource key 172. That is, the key manager 160 generates a new resource key 172 at a frequency based on the rotation rate. When the key manager 160 generates a new resource key 172 to replace an existing resource key 172, the key manager 160 may invalidate the previous resource key 172 (e.g., by sending a key invalidation message to each tablet server 150) and proceed with wrapping the resource key 172 with the user key 192 and the access control key 232, wrapping the DEKs 182, and distributing the wrapped DEKs 182W and the wrapped resource key 172W' to the tablet servers 150 as described with respect to FIGS. 1-5. The expiration time limit of the resource key 172 may be greater than the rotation rate to provide a fall back when communications between entities fail. For example, when the rotation rate is four hours (i.e., a new resource key 172 is generated every four hours), the resource key 172 expiration time limit may be six hours. Then, in a situation where the tablet servers 150 can no longer communicate with the key manager 160 and therefore do not receive the new resource key 172 at the appropriate time, the tablet servers 150 at least cease use of the stale resource key 172 when the key expires (i.e., after six hours in this example).

Optionally, the expiration time limit and the rotation rate for the resource key 172 are each configurable by the particular user 12. For example, the user indicates preferences for the expiration time limit and rotation rate when creating the table 158. In some implementations, the user may adjust the rotation rate and/or the expiration time limit at any point after creation of the table 158.

Figure 6:
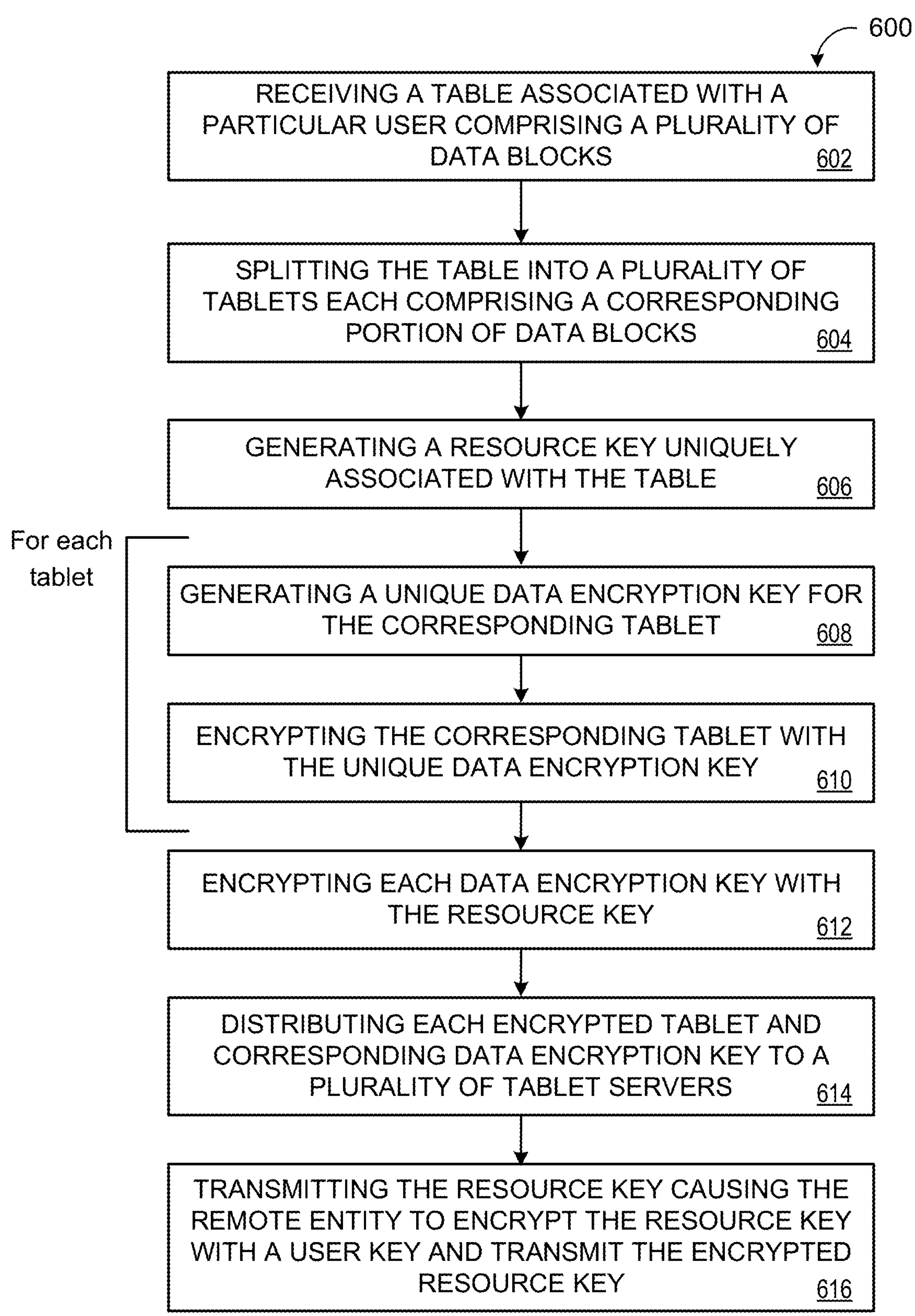
FIG. 6 is a flowchart of an example arrangement of operations for a method of distributing encryption keys.

FIG. 6 is a flowchart of an exemplary arrangement of operations for a method 600 for distributing encryption keys securely and efficiently. The method 600, at step 602, includes receiving, at data processing hardware 144, a table 158 associated with a particular user 12. The table 158 includes a plurality of data blocks 154. The method 600, at step 604, includes splitting, by the data processing hardware 144, the table 158 into a plurality of tablets 159. Each tablet 159 includes a corresponding portion of the plurality of data blocks 154 of the table 158. The method 600, at step 606, includes generating, by the data processing hardware 144, a resource key 172 uniquely associated with the table 158.

For each tablet 159 of the plurality of tablets 159, the method 600, at step 608, includes generating a unique data encryption key 182 for the corresponding tablet 159. At step 610, the method 600 includes encrypting, by the data processing hardware 144, the corresponding tablet 159 with the unique data encryption key 182. The method 600, at step 612, includes encrypting, by the data processing hardware 144, each data encryption key 182 with the resource key 172. At step 614, the method 600 also includes distributing, by the data processing hardware 144, control of each encrypted tablet 159 and each corresponding encrypted data encryption key 182W to a plurality of tablet servers 150. Each tablet server 150 in the plurality of tablet servers 150 is independent from each other tablet server 150 in the plurality of tablet servers 150. Each tablet server 150 controls one or more of the encrypted tablets 159 from the table 158. At step 616, the method 600 includes transmitting, by the data processing hardware 144, the resource key 172 to a remote entity 190. The resource key 172, when received by the remote entity 190, causes the remote entity 190 to encrypt the resource key 172 with a user key 192 associated with the particular user 12 and kept secret from the data processing hardware 144. The remote entity also transmits the encrypted resource key 172W to the data processing hardware 144.

Figure 7:
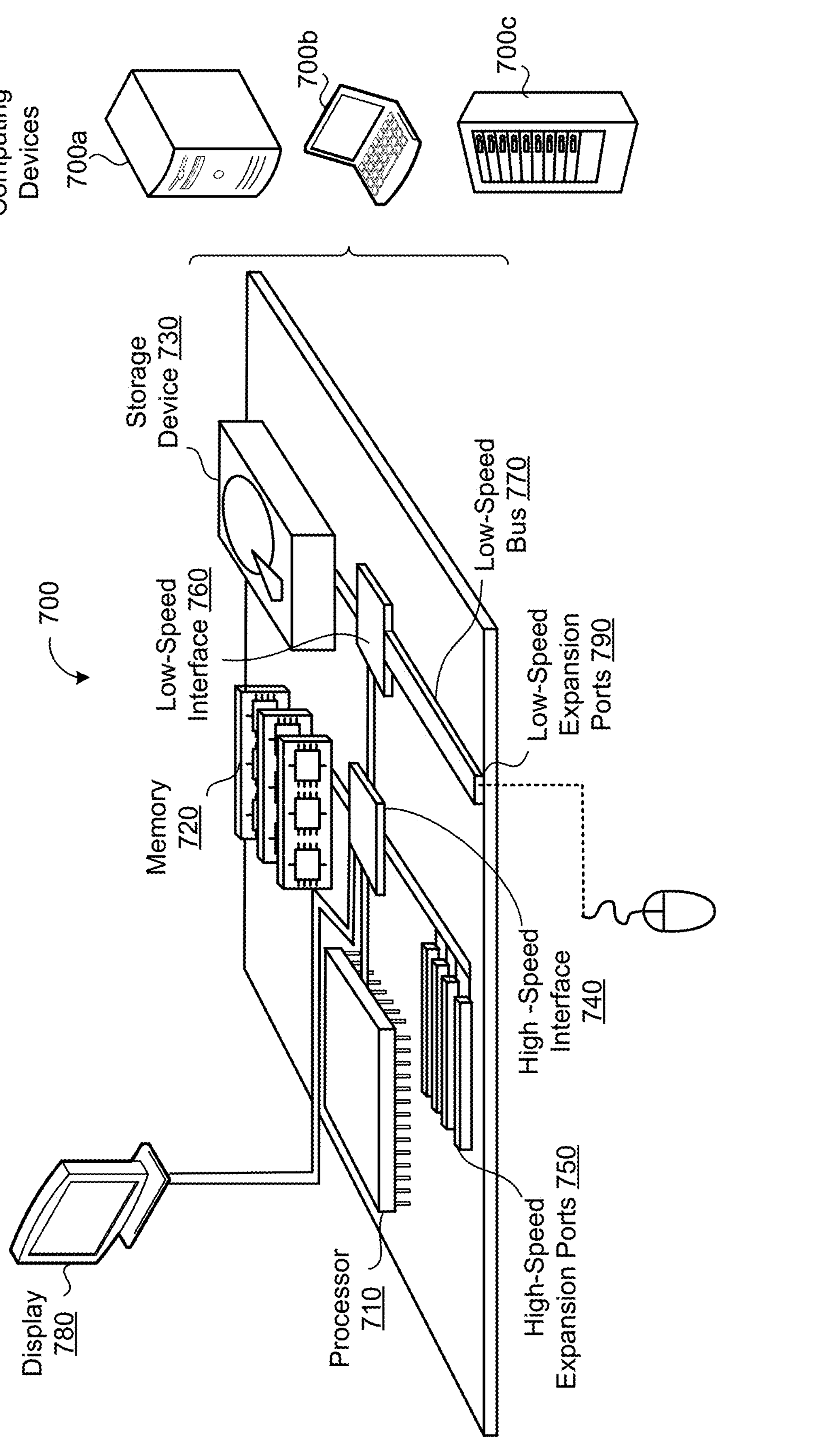
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, BLUETOOTH, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method, being implemented by data processing hardware, comprising:

receiving a table associated with a particular user;

generating a unique resource key uniquely associated with the table;

splitting the table into a plurality of tablets, for each tablet of the plurality of tablets:

generating a unique data encryption key for a tablet;

encrypting the tablet with the unique data encryption key; and encrypting the unique data encryption key with the unique resource key;

encrypting the unique resource key with an access control key associated with an access control list (ACL) comprising a list of tablet servers authorized to access the unique resource key;

distributing, by the data processing hardware, control of each encrypted tablet and each corresponding encrypted data encryption key to a plurality of tablet servers;

receiving, from a tablet server, a resource key request requesting to decrypt the unique resource key encrypted with the access control key associated with the ACL;

determining that the tablet server is authorized to access the unique resource key based on the ACL;

based on determining that the tablet server is authorized to access the unique resource key, decrypting the unique resource key encrypted with the access control key; and transmitting the decrypted unique resource key to the tablet server, the decrypted unique resource key, when received by the tablet server, is configured to cause the tablet server to:

decrypt, using the decrypted unique resource key, the unique data encryption key corresponding to the encrypted tablet associated with the tablet server; and decrypt, using the decrypted unique data encryption key, the encrypted tablet.

2. The method of claim 1, wherein the table comprises a plurality of data blocks, and wherein each tablet comprises a corresponding portion of the plurality of data blocks of the table.

3. The method of claim 2, wherein each tablet server in the plurality of tablet servers is independent from each other tablet server in the plurality of tablet servers, and wherein the method further comprises:

controlling access to one or more encrypted tablets from the table.

4. The method of claim 3, further comprising: transmitting the unique resource key to a remote entity, wherein the unique resource key, when received by the remote entity, causes the remote entity to:

encrypt the unique resource key with a user key associated with the particular user and kept secret from the data processing hardware; and transmit the encrypted unique resource key to the data processing hardware.

5. The method of claim 1, wherein the unique resource key comprises an expiration time limit.

6. The method of claim 5, further comprising: rotating the unique resource key at a rotation rate that is less than the expiration time limit of the unique resource key.

7. The method of claim 6, wherein the expiration time limit and the rotation rate are each configurable by a user.

8. A system comprising:

data processing hardware; and memory hardware in communication with the data processing hardware, the memory hardware storing instructions that when executed on the data processing hardware cause the data processing hardware to:

receive a table associated with a particular user;

generate a unique resource key uniquely associated with the table;

split the table into a plurality of tablets, for each tablet of the plurality of tablets:

generate a unique data encryption key for a tablet;

encrypt the tablet with the unique data encryption key; and encrypt the unique data encryption key with the unique resource key;

encrypt the unique resource key with an access control key associated with an access control list (ACL) comprising a list of tablet servers authorized to access the unique resource key;

distribute control of each encrypted tablet and each corresponding encrypted data encryption key to a plurality of tablet servers;

receive, from a tablet server, a resource key request requesting to decrypt the unique resource key encrypted with the access control key associated with the ACL;

determine that the tablet server is authorized to access the unique resource key based on the ACL;

based on determining that the tablet server is authorized to access the unique resource key, decrypt the unique resource key encrypted with the access control key; and transmit the decrypted unique resource key to the tablet server, the decrypted unique resource key, when received by the tablet server, is configured to cause the tablet server to:

decrypt, using the decrypted unique resource key, the unique data encryption key corresponding to the encrypted tablet associated with the tablet server; and decrypt, using the decrypted unique data encryption key, the encrypted tablet.

9. The system of claim 8, wherein the table comprises a plurality of data blocks, and wherein each tablet comprises a corresponding portion of the plurality of data blocks of the table.

10. The system of claim 9, wherein, each tablet server in the plurality of tablet servers is independent from each other tablet server in the plurality of tablet servers, and wherein the instructions further cause the data processing hardware to:

control access to one or more of the encrypted tablets from the table.

11. The system of claim 10, wherein the instructions further cause the data processing hardware to:

transmit the unique resource key to a remote entity, wherein the unique resource key, when received by the remote entity, causes the remote entity to:

encrypt the unique resource key with a user key associated with the particular user and kept secret from the data processing hardware; and transmit the encrypted unique resource key to the data processing hardware.

12. The system of claim 8, wherein the unique resource key comprises an expiration time limit.

13. The system of claim 12, wherein the instructions further cause the data processing hardware to rotate the unique resource key at a rotation rate that is less than the expiration time limit of the unique resource key.

14. The system of claim 13, wherein the expiration time limit and the rotation rate are each configurable by a user.

* * * * *